April 24, 1956  I. H. PAGE  2,743,438
ECHO-RANGING SYSTEM
Filed Dec. 11, 1945  4 Sheets-Sheet 1

Inventor
IRVING H. PAGE

April 24, 1956     I. H. PAGE     2,743,438

ECHO-RANGING SYSTEM

Filed Dec. 11, 1945     4 Sheets-Sheet 4

Inventor

IRVING H. PAGE

United States Patent Office 2,743,438
Patented Apr. 24, 1956

2,743,438
ECHO-RANGING SYSTEM
Irving H. Page, Washington, D. C.

Application December 11, 1945, Serial No. 634,338

13 Claims. (Cl. 343—9)

(Granted under Title 35, U. S. Code (1952), sec. 266)

This invention relates generally to radio detection and ranging apparatus; in particular it relates to apparatus for detecting, ranging, and evaluating the radial speed of remote moving objects.

Military use of radio-echo ranging and direction-finding systems, hereinafter called "radar systems," has shown the need for a system capable of singling out moving objects as opposed to stationary ones. It has been demonstrated frequently that a moving object, such as an airplane, can elude detection by conventional radar apparatus simply by following a route which keeps the moving object near or over islands, mountains, forests, shorelines, and other stationary objects likely to show radio echoes on the radar indicator. The echo from the moving object, in such a case, is obscured by stronger echoes from the stationary targets at the same range and bearing from the radar equipment.

This invention provides a radar indicator which is unresponsive to radio echoes from stationary objects and highly sensitive to those produced by moving objects. Thus it affords a means of solving the problem just described. In addition to singling out radio echoes from moving objects, this invention provides as well a means of evaluating by direct indication the radial velocity of a detected object with respect to the radar installation incorporating the invention.

An object of this invention is to provide an echo de-detecting and ranging apparatus which will detect moving objects and reject echoes from stationary objects.

Another object of this invention is to provide a moving target indicator for radar systems which will indicate the presence of remote moving objects and give data on their range and radial velocity.

The invention accomplishes its objectives by making use of the physical phenomenon known as the Doppler effect. As is well known, relative radial motion between the source of a wave radiation and the point at which it is detected causes the frequency of the radiation as observed at the receiving point to differ from the frequency as transmitted at the source. A radar signal, transmitted from a fixed installation and reflected to its point of origin from a moving object, undergoes a Doppler shift on both the going and the return journeys; as a result the total shift of frequency resulting from Doppler effect in such a case may be expressed by the well known equation $$\Delta f = 2f_0 \left(\frac{v}{c}\right)$$

where $\Delta f$ is total frequency shift, $f_0$ is the carrier frequency as transmitted, $v$ is the radial velocity of the object relative to the radar installation, and $c$ is the velocity of light.

The total frequency shift produced by Doppler effect is, as the equation indicates, directly proportional to the carrier frequency of the radar transmitter. This shift, for normal terrestrial speeds and the radar frequencies in general use, will lie in the audio frequency region. For example, a radial target velocity of 300 miles per hour will produce a frequency shift of 179 cycles per second in a 200 mc./s. signal. A radial target velocity of 25 miles per hour will produce a frequency shift of 224 cycles per second in a 3000 mc./s. signal.

It has been determined, by experimentation and study, that radio echoes from moving targets and "clutter-echoes" from stationary objects at about the same range will in practice beat with one another and produce amplitude modulation of the echoes at the Doppler shift frequency. The degree of amplitude modulation thus produced will depend on the amplitude of the clutter echoes. If the moving object is surrounded by stationary objects which return echoes of strength comparable to those returned from the moving object, this amplitude modulation may reach one hundred per cent. It has been found that in practically all cases sufficient clutter is present to yield at least five to ten per cent amplitude modulation of the returning echoes at the Doppler shift frequency.

In this invention means are provided for separately analyzing the echo pulses from each detected object and filtering therefrom a Doppler frequency component of voltage, if one exists. An indicator is provided which shows only those targets for which a Doppler frequency component is detected; that is, the moving targets only. In addition means are afforded for evaluating the frequency of the Doppler voltage component returned from moving targets and for deriving therefrom an indication showing the radial velocity of each moving target detected.

The invention will be described in detail with reference to the appended drawings, of which:

Figure 3 is a schematic diagram of a swept-gate pulse generator, a component which may be employed in either embodiment of the invention;

Figure 6 is a diagrammatic representation of the indicator screen of the Figure 2 embodiment as it might appear when echoes from three moving targets, at various ranges, are being intercepted;

Figure 1:
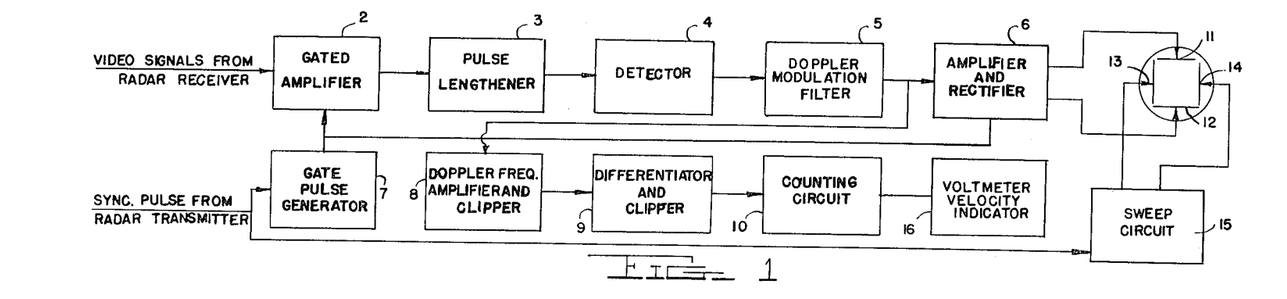
Figure 1 is a block diagram of one embodiment of the invention.

With reference to Figure 1, it will be assumed in describing this block diagram that the invention is employed in association with a conventional radar system, having a recurrent pulse transmitter and a synchronized receiver operative during the intervals between transmitted pulses. The video echo pulses from the radar receiver are fed into a gated amplifier 2, normally inoperative but periodically activated by a gate pulse from a gate pulse generator 7, to be further described hereinafter. Assume for the present discussion that amplifier 2 is activated for a few microseconds at the proper interval after each transmitted pulse to pass only the echo pulses from a particular target.

Signals passed by gated amplifier 2 are fed to a pulse lengthener circuit 3 which greatly extends the duration of the individual echo pulses while leaving their relative amplitudes unchanged. The output signals from the pulse lengthener circuit are rectified by detector 4, producing a voltage which follows approximately the amplitude envelope of the video pulses fed to the detector. This amplitude envelope voltage is then fed to a low pass filter 5, denoted on the drawing "Doppler modulation filter." This filter suppresses the pulse repetition frequency component of voltage and other components having frequencies higher than the Doppler shift modulation; hence the voltage at the output of filter 5 is an essentially sinusoidal voltage having the frequency of the Doppler shift caused by the radial motion of the particular target whose echoes are being passed by the gated amplifier. If that traget is not moving, its echoes will have no Doppler shift, and the output from the Doppler modulation filter will be zero.

The beam deflection plates of a cathode ray tube are shown schematically on Figure 1; the plates producing horizontal deflection are denoted 13 and 14 respectively; the plates producing vertical beam deflection are indicated by reference numerals 11 and 12 respectively. To horizontally deflecting plates 13 and 14 is applied the output voltage from a sweep circuit 15, which, responsively to synchronizing pulses from the radar transmitter, starts a sweep simultaneously with each transmitted pulse, as in the usual radar indicator.

The output voltage from the Doppler modulation filter is fed into an amplifier-rectifier circuit 6, which is gated by the same gate pulse employed to gate amplifier 2. The output voltage from amplifier 6 is rectified and applied to the vertical deflection plates 11 and 12 of the indicator cathode ray tube. The effect of gating the amplifier 6 is to apply the instantaneous value of the Doppler modulation voltage to the vertical plates at the appropriate time during each sweep to produce a deflection on the indicator trace at the point corresponding to the actual range of the object whose echo is being selected by the gate voltage. The phase relation between the Doppler voltage and the gate voltage is purely random, so that in the course of a few sweeps the instantaneous value of Doppler-frequency voltage fed to the vertical plates will have varied from zero to maximum to produce a bright filled-in "pip" to indicate on the screen the presence of the moving target.

All the foregoing discussion of the invention has been based, it will be recalled, on the assumption that the gate pulses applied to the gated amplifier 2 are timed to activate the amplifier for a few microseconds at a fixed time delay after each transmitted pulse, so as to admit only the echoes from a single target. The gate pulse generator 7 may be adjusted to produce such a gate, and as will be later explained, such a gate voltage is produced in this embodiment when determination of a target velocity is desired. When, however, the invention is being used to search for moving targets, a so-called "swept-gate" voltage is generated in generator 7 and applied to amplifiers 2 and 6. Generator 7, responsively to the synchronizing pulses from the radar transmitter, produces after each transmitted pulse a gate voltage pulse of a few microseconds duration. These gate pulses are not, however, produced at a constant delay time after the transmitted pulses; on the contrary the delay intervening between the transmitted pulse and the gate pulse is made to vary periodically at a slow rate, between limits which may be chosen at will. The net result is to cause the gate pulse to "sweep" slowly through some predetermined portion of the echo-return period, and thereby to bring successively within the gate for a portion of the gate sweep period each echo signal returning from the range interval encompassed by the gate sweep. The gate sweep frequency should be low enough to permit a considerable number of echo pulses from a given target to pass into the Doppler filter while the gate is "sweeping through" the range of that target. This low gate-sweep rate is required because the Doppler shift frequencies lie in the low audio range, and several cycles of the Doppler shift frequency must be passed through the filter if an effective signal indication is to be obtained on the indicator screen. One sweep per second might be a typical gate-sweep rate for a radar system having a pulse repetition frequency of several hundred per second.

The indication on the screen of the cathode ray indicator resulting from the application of the sweep gate just described is a vertical pip for each moving target, distributed across the time base according to the respective ranges of the moving targets detected. Each moving target produces a signal just as was explained heretofore for the case of the constant-delay gate, except that instead of the continuous production of a single pip, indicating the range of one moving target, a pip for each detected moving target is produced in succession as the swept gate sweeps from one end of the selected range interval to the other. The screen of the cathode ray indicator tube may be of the type having long persistence properties, and thus the indicator may be caused to show simultaneously pips for all the moving targets detected within the limits of range covered by the swept gate.

In Figure 3 is shown the detailed circuit of a suitable swept gate generator, with appropriate controls operable either to set the gate at a constant delay so as to continuously admit echoes from a single target or to cause the gate to sweep through any range desired. This circuit will be described in a later paragraph.

Still referring to Figure 1, the voltage at the output of the Doppler modulation filter 5 is fed into an amplifier and clipper 8 which amplifies the Doppler frequency voltage if any is coming through, and clips the waveform thereof to produce a square wave having an amplitude independent of that of the input voltage but having the same frequency. The output of amplifier-clipper 8 is fed to a differentiating and clipping circuit 9 which differentiates the square wave voltage fed to it and clips off the negative pulses from the resulting pulse train. Then the output voltage from circuit 9, comprising a train of positive pulses, one for each cycle of Doppler voltage from filter 5, is applied to a counting circuit 10 which produces an output voltage proportional to the frequency of the pulse train fed into it. The counting circuit output is applied to a voltmeter 16.

The portion of the invention just described may be employed to evaluate the radial velocity of any desired moving target. When the invention is being employed to sweep over a selected range and show moving targets therein, the velocity indicator portion of the system is inoperative. If, however, the velocity of a particular moving target is desired, the gate generator 7 is adjusted to stop sweeping and to produce a constant delay gate pulse timed to admit only the echoes from the particular target whose velocity is desired. Then, since the echoes passing through the Doppler modulation filter are coming from a single target, the reading of the voltmeter 16 is proportional to the Doppler frequency of the echoes from that target and hence proportional to the radial velocity of that target. Direct calibration of voltmeter 16 in miles per hour or any other desired units can be easily accomplished.

A design consideration relative to the invention which must be taken into account is that the pulse repetition frequency of the radar must be made considerably higher than the highest Doppler modulation frequency likely to be encountered. In practice it has been found that the pulse repetition frequency should be at least twice as high as the highest Doppler frequency of importance. One reason for this requirement is the necessity for effectively filtering the pulse repetition frequency component of signal voltage from the Doppler-shift frequency component. This requires that the pulse repetition frequency be substantially higher, percentage-wise, than the highest frequency from which it is to be separated. Determination of the highest Doppler frequency of importance must be determined from the carrier frequency employed and the character of service in which the application is to be used. In a radar to be employed for locating moving tanks and trucks in wooded terrain a Doppler shift frequency corresponding to a speed of 60 miles per hour might be the maximum of consequence. In a system to be used for aircraft interception, on the other hand, much higher maximum velocities must be allowed for. Another reason for employing a pulse repetition frequency at least twice the highest Doppler frequency is the desirability of obtaining velocity indications which are free from beats between the pulse-repetition component and the Doppler-shift component of signal voltage.

Figure 2:
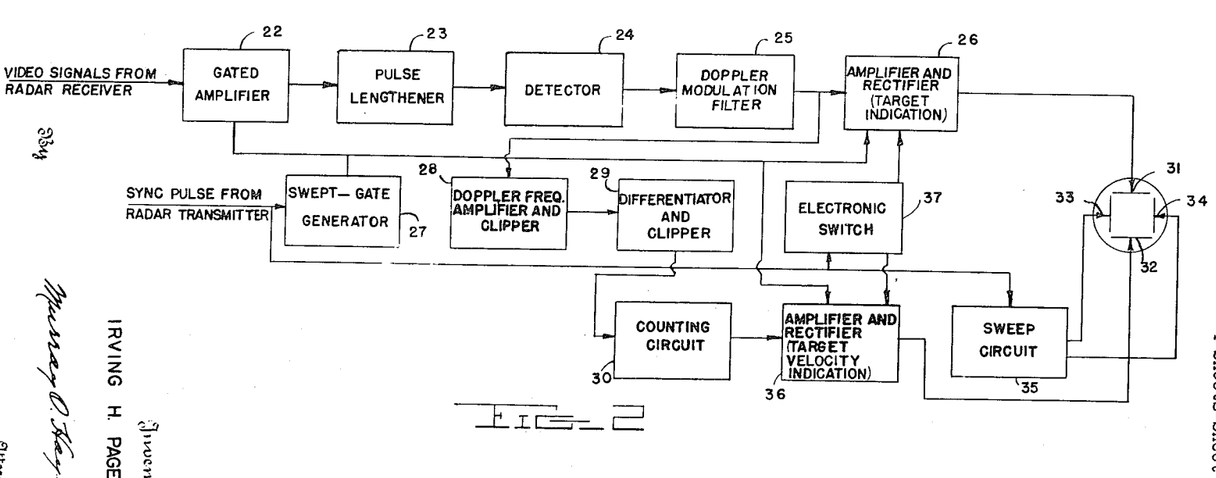
Figure 2 is a block diagram of another embodiment of the invention.

Figure 2 shows, in the form of a block diagram, a somewhat more complicated embodiment of the invention which indicates the presence and range of moving targets in the same manner as the Figure 1 embodiment and in addition gives, by direct indication on the screen of the cathode ray indicator tube, continuous information as to the radial velocity of all moving targets detected by the invention. The Figure 2 embodiment employs a gated amplifier 22, a pulse lengthener circuit 23, a detector 24, and a Doppler modulation filter 25, respectively similar to and interrelated in the same manner as the corresponding components of the Figure 1 embodiment. As in the previous embodiment, video signals from the radar receiver are fed into the gated amplifier. Doppler frequency voltage from the Doppler modulation filter is fed to an amplifier and rectifier 26, corresponding to unit 6 of the first embodiment. As in the previously described form of the invention a cathode ray tube is employed as an indicating device; its beam deflecting plates are shown schematically in Figure 2. Plates 31 and 32 are the vertically deflecting plates, and plates 33 and 34 are horizontally deflecting plates. A sweep circuit 35 applies a sweep voltage to horizontally deflecting plates 33 and 34 causing the beam to sweep systematically across the face of the tube to provide an indicator time base. The sweep circuit 35 is triggered by synchronizing pulses from the radar transmitter to start a sweep simultaneously with each transmitted pulse.

The output pulses from amplifier-rectifier unit 26 are applied to vertically deflecting plate 31. The other vertically deflecting plate 32 is in this embodiment of the invention employed to show visually the velocity of moving targets, as will be hereinafter explained.

Gated amplifier 22 and amplifier-rectifier 26 are rendered intermittently operative by a swept gate generator 27, similar to generator 7 in Figure 1. As in the first embodiment, the swept gate generator is synchronized with the radar system by pulses from the transmitter.

The output of the Doppler modulation filter 25 is fed into a Doppler-frequency amplifier and clipper 28, which is in turn connected to a differentiator-clipper circuit 29. The output pulses from unit 29 are fed into a counting circuit 30, which differs in one important respect from the counting circuit 10 of the Figure 1 embodiment. That distinction will be fully described in a subsequent paragraph dealing with the operation of this embodiment. The output of the counting circuit is fed into an amplifier-rectifier unit 36, which may be similar to unit 26 and which is, like unit 26, gated by the swept gate generator 27. The output of unit 36 is applied to vertically deflecting plate 32 of the cathode ray indicator. An electronic switch 37 is triggered by the synchronizing pulses from the transmitter and is connected to units 26 and 36 in appropriate manner to render them alternately operative. That is, during one sweep of the beam unit 26 is operative, so that any vertical deflection during that sweep is governed by the voltage output of unit 26. During the next sweep of the beam electronic switch 37 turns off unit 26 and activates unit 36, and so on.

The operation of this embodiment of the invention is in most respects similar to that of the embodiment already described; the distinction lies primarily in the mode of presentation of target velocity data. As before the swept gate generator, responsively to the synchronizing pulses from the transmitter, produces gate pulses of a few microseconds duration whose delay after the transmitted pulse varies periodically at a slow rate, thus bringing within the gate in succession each target echo within the range limits desired. The rate of gate sweep is low, as in the Figure 1 embodiment, so that several cycles of Doppler modulation voltage are produced by the filter while the gate is sweeping through the range of a particular echo signal.

The voltage at the output of the Doppler modulation filter is fed into gated amplifier-rectifier 26 and is therefrom applied to deflection plate 31, producing signal pips distributed across the cathode ray time base according to the respective signal ranges, just as in the first embodiment described. One important difference exists in the echo-signal presentation in this case, however; it is that, due to the action of electronic switch 37, the signal channel through unit 26 is operative on only every other sweep of the time base. Because of the high switching rate this produces no visible change in the presentation, but it does make one half of the time-base sweeps available for presentation of some other kind of data—in this case, information as to target velocity.

The counting circuit in this embodiment, as stated heretofore, differs from that employed in the first embodiment. In the first embodiment the counting circuit was required only to produce an output voltage proportional to the frequency of the single Doppler shift signal fed into it. That output voltage might be D. C., since no differentiation between one signal and another was required. In this embodiment, wave-trains, having different frequencies according to the respective velocities of the signals intercepted, are fed into the counter, separated by only so much time as may be required for the swept gate to sweep from the range of one target to the range of the next. Hence this counter produces for each wave train fed into it a step-voltage pulse, equal in duration to the wave-train and having peak value proportional to its frequency. The circuit of a typical counter employable in this application is shown in Figure 5 and is described in a later paragraph hereof.

Figure 8:
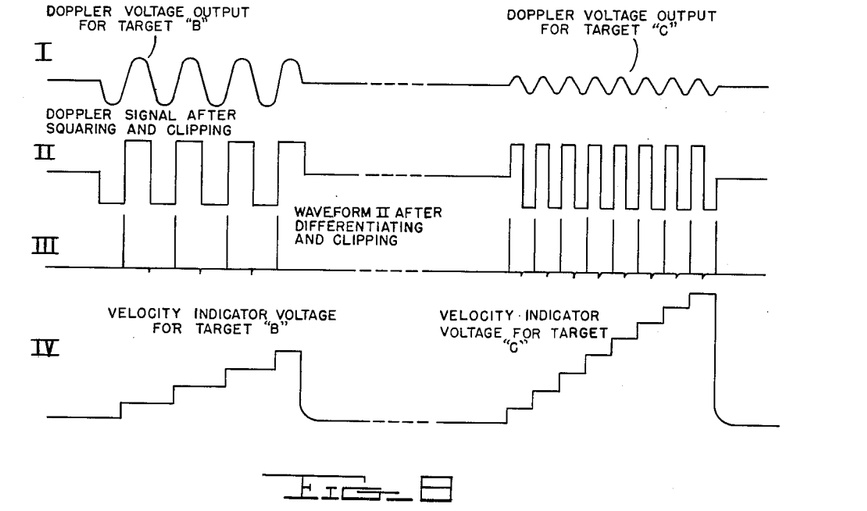
Figure 8 is a series of graphs in Cartesian coordinates showing certain voltage waveforms involved in the operation of the circuits of Figure 5.

Typical waveforms produced by it are shown in Figure 8, also to be discussed later.

The counting circuit output, consisting of a train of step-voltage pulses, is applied to amplifier-rectifier circuit 36. The individual step-voltage pulses, as explained in the preceding paragraph, have peak-values proportional in each case to the frequency of the Doppler-shift voltage that produced them. They are fed through a gated amplifier-rectifier unit 36 and applied to vertical deflection plate 32. Thus on those alternate sweeps of the time base during which unit 36 is operative, beam deflection downward from the base line occurs, and the swept gate causes an indication for each detected moving target to appear in turn at the point on the time base corresponding to the target range. The amplitude of these indications is not dependent upon the strength of the Doppler modulation components but upon their frequency. Hence, the face of the tube may be appropriately calibrated to show radial target velocity as a function of the amplitude of the downward deflections.

Fig. 6 illustrates the type of data presentation afforded by the cathode ray indicator of the Fig. 2 embodiment. As shown in Fig. 6, the horizontal time base may be marked off or otherwise calibrated in terms of range, just as is customary in the conventional A-scan radar indicator. Similarly, by a calibration based on the magnitude of downward deflection, a direct target-velocity scale may be provided, as shown.

On the indicator screen represented in Fig. 6, three moving targets are being detected. Target "A" is shown to be at a range of about 28 miles with a radial velocity of about 250 miles per hour. Target "B" is at a range of about 45 miles with a radial velocity of approximately 150 miles per hour. Target "C" is at almost 80 miles range and its radial velocity is shown to be about 300 miles per hour. From the examples just given, the mode of presentation and the technique of interpreting data should be apparent.

The foregoing paragraphs have described in general terms the structure and operation of two embodiments of the invention. The remainder of this specification will be devoted to a description of certain components of the invention which are not conventional electronic circuits. In the description of these components, it will be assumed that the foregoing general description of the system operation has been understood by the reader.

Fig. 3 shows the block and schematic circuit diagram of apparatus which may be employed as a swept-gate generator in either the Fig. 1 or the Fig. 2 embodiments. The function of the swept-gate generator, it will be recalled, is to provide a short duration voltage pulse, occurring at the same repetition rate as the transmitted radar pulses but delayed relative to them by an interval which may be fixed at a desired value or made periodically variable between desired limits.

Triode tubes 50 and 60 are connected in a cathode coupled multivibrator circuit; the synchronizing pulses from the radar transmitter are applied through condenser 51 to the grid of tube 50. Gridleak 52 is connected between the grid of tube 50 and ground. The plate of tube 50 is connected through load resistor 53 to the positive side of D. C. source 59. The negative side of source 59 is grounded. The cathodes of tubes 50 and 60 are joined together and are connected to ground by a common cathode resistor 54. The plate of tube 60 is connected to the positive side of D. C. source 59 by load resistor 63. The grid of tube 60 is coupled to the plate of tube 50 by condenser 55. A voltage divider, consisting of resistor 64, the resistance element of potentiometer 65, and resistor 66 in series, is bridged across the terminals of D. C. source 59. Gridleak resistor 56 is connected between the grid of tube 60 and the movable tap of potentiometer 65.

A sawtooth voltage generator 75 produces a sawtooth voltage having a frequency of the order of one cycle per second. The output of this voltage generator is coupled through condenser 71 to the grid of triode tube 70. The plate of tube 70 is connected to the positive side of source 59. The cathode of tube 70 is connected to ground through the series combination of resistor 78 and the resistance element of potentiometer 72. Gridleak resistor 74 is connected between the grid of tube 70 and the junction of resistor 78 and potentiometer 72. The movable tap of potentiometer 72 is coupled through coupling condenser 73 to the movable tap of potentiometer 65. Coupling condenser 73 is a very large capacitor capable of passing readily currents of the low frequency generated by generator 75.

The plate of tube 60 is coupled by condenser 67 to the input of a cathode follower 90, shown in block form. A differentiator circuit consisting of condenser 91 and resistor 92 in series is connected between the output of cathode follower 90 and ground. The junction of condenser 91 and resistor 92 is coupled through condenser 84 to the grid of tube 80. Resistor 83 is connected between the grid and cathode of tube 80. Resistor 81 is connected between the cathode of tube 80 and ground. The plate of tube 80 is connected to the positive side of D. C. source 59. The cathode of tube 80 is coupled through condenser 82 to the input of an amplifier-inverter-clipper unit 100, shown in block form. This unit may consist of a single amplifier stage followed by a cathode follower. The output of unit 100 is connected to output terminal 101. The swept-gate pulse may be taken between terminal 101 and ground for application to the various circuits to be gated.

The generator operates as follows: In the multivibrator comprising tubes 50 and 60 tube 60 is normally conducting and tube 50 is normally cut off. Application of a positive synchronizing pulse from the radar transmitter to the grid of tube 50 will cause the multivibrator to shift to its unstable state with tube 50 conducting and tube 60 cut off. When the grid of tube 60 has risen in potential, due to the charging of condenser 55, sufficiently to allow tube 60 to conduct, the multivibrator again assumes its stable state, with tube 60 conducting. This multivibrator operation produces a positive rectangular voltage pulse at the plate of tube 60. This rectangular voltage pulse is stepped up in power level by cathode follower 90 and applied to differentiator circuit 91, 92. The waveform symbol shown on the drawing below cathode follower 90 indicates the shape of the waveform at this point. The differentiator output is applied to the grid of clipper tube 80, which clips the positive pulse from the differentiator and passes through a negative pulse, whose leading edge is simultaneous with the trailing edge of the original rectangular pulse from the multivibrator. This negative pulse is squared and inverted in unit 100. The resulting positive, approximately rectangular pulse is employed as the swept-gate pulse. Wave form symbols on the drawing indicate the various steps of the pulse-shaping process.

Since the output pulse is initiated by the trailing edge of the multivibrator pulse, the delay between the synchronizing pulse and the gate pulse is obviously equal to the duration of the multivibrator pulse. The duration of this pulse is a function of the voltage to which the grid of tube 60 is returned; hence it depends upon the potential at the movable tap of potentiometer 65. The average potential at that point is governed by the position of the tap on potentiometer 65. A periodical variation may, if desired, be superimposed on that average potential by impressing thereon the sawtooth voltage from the cathode circuit of tube 70. The magnitude of this variational voltage may, of course, be varied from zero to the greatest value desired by adjustment of the position of the movable tap on potentiometer 72. Thus adjustment of potentiometer 72 controls the total amount of variation in the time delay intervening between the synchronizing pulse and the gate pulse; and adjustment of potentiometer 65 fixes the average magnitude of the delay. Suppose it be desired to sweep the gate between the ranges of 30 and 75 nautical miles, for example, so as to search for moving targets within that span of range. Time delay between transmitted pulse and echo equals 12.36 microseconds per nautical mile of range, so echoes from targets at a thirty mile range arrive 30×12.36 or 370 microseconds after the transmitted pulse. Similarly the time delay on 75 mile targets is 925 microseconds. Proper adjustment of the swept gate generator would therefore involve moving the tap on potentiometer 72 to the setting at which the total variation in delay is 925−370 or 555 microseconds, and adjusting potentiometer 65 to the setting whereat the minimum delay time is 370 microseconds as desired. In practice, of course, potentiometer 72 might be calibrated in terms of total miles of range swept, and potentiometer 65 could be calibrated in terms of average range.

If desired, the tap on potentiometer 72 may be set at the grounded end of the resistance element. This eliminates entirely the sawtooth voltage, and the position of the gate pulse relative to the synchronizing pulse is then entirely controllable with the potentiometer 65. This last described procedure would be appropriate for any occasion where it is desirable to single out the echoes from a particular target, as for measuring a target's velocity in the Fig. 1 embodiment.

Figure 4:
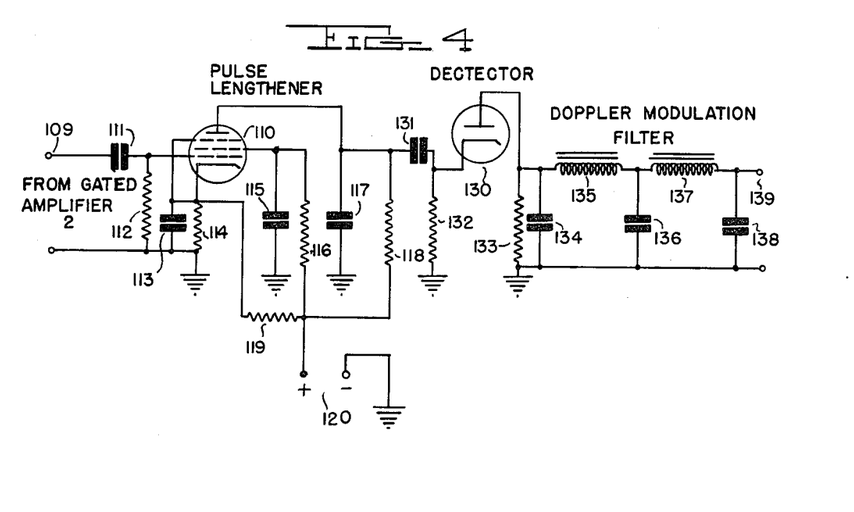
Figure 4 is a schematic diagram showing detailed circuits which may be employed in either embodiment as the pulse lengthener, detector, and Doppler modulation filter components of the invention.
Figures 4, 5:
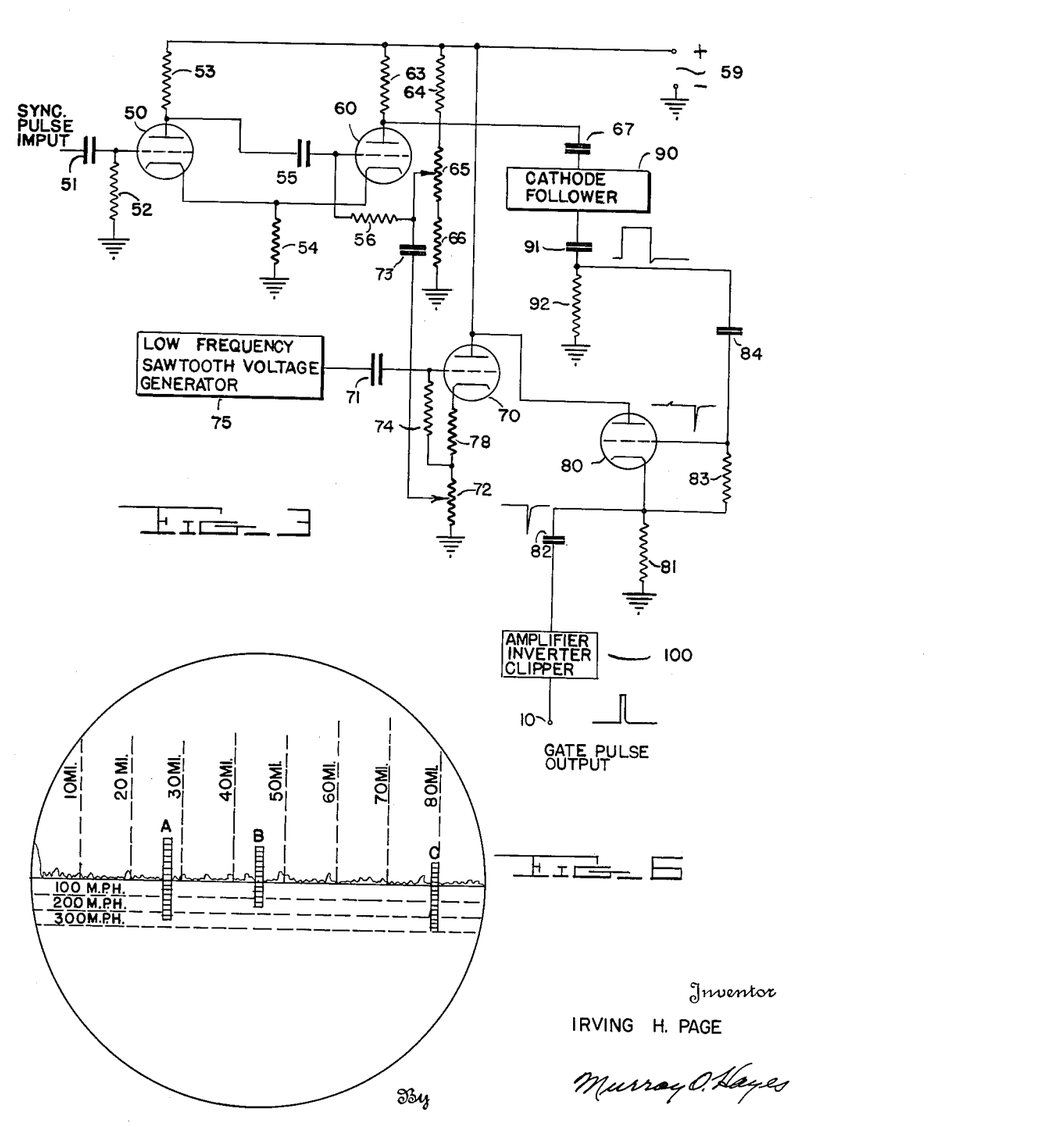
Figure 5 is a schematic diagram showing detailed circuits which may be employed in the Figure 2 embodiment of the invention as differentiator-clipper and counting circuit components.
Figure 5:
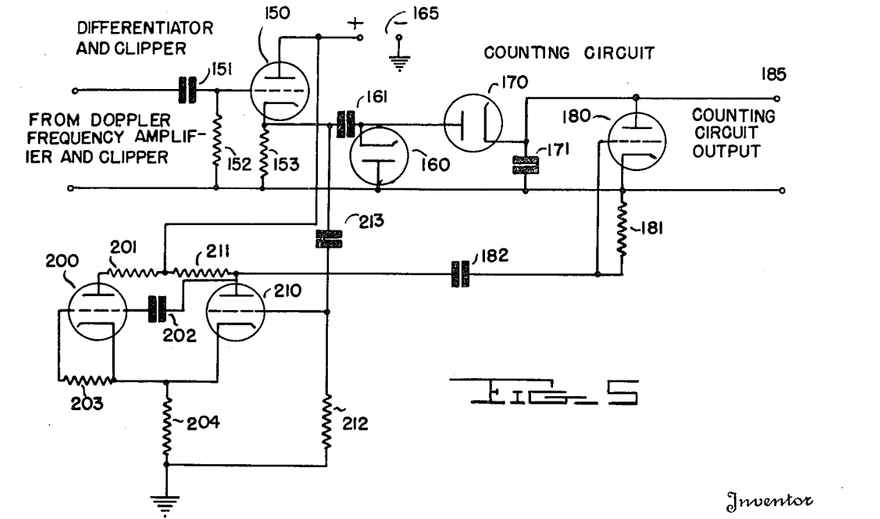

Fig. 4 is a schematic diagram showing apparatus which may be employed in either embodiment of the invention as pulse-lengthener, detector, and Doppler modulation filter components. Signals taken from the output of the gated amplifier are applied between input terminal 109 and ground. Condenser 111 is connected between terminal 109 and the control grid of pentode tube 110. Resistor 112 is connected between the control grid of tube 110 and ground. The suppressor grid and cathode of tube 110 are joined together and are connected to ground through biasing resistor 114. Resistor 114 is shunted by by-pass condenser 113. Resistor 119 is connected between the cathode of tube 110 and the positive side of D.-C. source 120. Resistor 116 is connected between the screen grid of tube 110 and the positive side of source 120. Condenser 115 is connected between the screen grid of tube 110 and ground. Resistor 118 is connected between the plate of tube 110 and the positive side of source 110. Condenser 117 is connected between the plate of tube 110 and ground. The negative side of source 120 is grounded.

A coupling condenser 131 is connected between the plate of tube 110 and the cathode of diode tube 130. Resistor 132 is connected between the cathode of diode 130 and ground. Resistor 133 is connected between the plate of diode 130 and ground. Condenser 134 is in parallel with resistor 133. A pair of inductance coils, 135 and 137 respectively, are connected in series between the plate of diode 130 and output terminal 139. Condenser 136 is connected between ground and the junction of coils 135 and 137. Condenser 138 is connected between output terminal 139 and ground.

Figure 7:
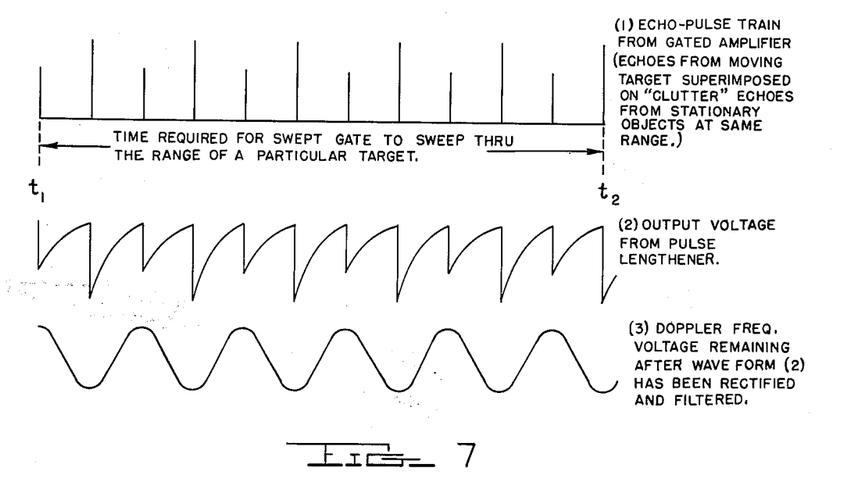
Figure 7 is a series of graphs in Cartesian coordinates showing certain voltage waveforms involved in the operation of the circuits of Figure 4.

Operation of the series of circuit components in Fig. 4 may best be described with reference to the waveforms shown in Fig. 7. Fig. 7 shows three graphs in Cartesian coordinates, time being the abscissa and voltage the ordinate in each case. No numerical calibration of the axes is shown. The total width of the time axis in each graph represents the time during which the echo of a particular target is within the swept-gate as the gate sweeps through a range sector. One cycle per second has been suggested as a suitable rate for the gate-sweep; on that basis the total time represented by the time axes in the various graphs of Fig. 7 might be about a fiftieth of a second.

Graph (1) in Fig. 7 represents a series of echo pulses from a particular target as produced at the output of the gated amplifier, unit 2 in the Fig. 1 embodiment or unit 22 in the Fig. 2 embodiment of the invention. Note that these pulses do not have constant amplitude but are amplitude-modulated at a frequency equal to one-half the pulse-repetition-frequency. This modulation represents the effect of the Doppler-shift caused by the radial velocity of the target. (The frequency of Doppler-shift modulation was arbitrarily selected for this drawing as half the pulse-repetition-frequency; the actual frequency in practice would of course be governed by the radar carrier frequency and the target velocity.)

The pulses shown in graph (1) are applied to the control grid of pulse-lengthener tube 110. Tube 110 is normally biased to cutoff by reason of the cathode bias provided by the voltage divider 119, 114. Hence the normal plate potential of tube 110 is equal to that of D.-C. source 120 and condenser 117 is normally charged to the full D.-C. source potential. When a positive pulse of voltage strikes the control grid of tube 110, the tube is suddenly rendered conducting, a pulse of plate current flows, and condenser 117 is thereby partially discharged, lowering the plate voltage from its quiescent value. After the very short pulse on the grid has ended, plate current ceases to flow and condenser 117 starts to recharge. The magnitude of resistor 118 is such, however, that the time constant of charging is relatively long, so that the condenser 117 has just time enough to recharge fully before the next pulse is applied to the grid. The magnitude of the voltage drop occasioned by the plate current pulse is proportional to the magnitude of the grid pulse producing it; hence the plate voltage pulses, while longer in duration, have peak values proportional to the peak values of the grid voltage pulses. The plate voltage waveform, which is the output voltage from the pulse-lengthener, is shown in Fig. 7 as graph (2).

The voltage of graph (2) is a complex waveform having many frequency components in addition to the desired components caused by Doppler shift. The function of the detector tube 130 and the Doppler modulation filter is to extract from the wave its Doppler-shift component, suppressing the undesired components. The voltage pictured in graph (2) is rectified by tube 130 and then applied to the filter, comprising inductance coils 135 and 137 and condensers 134, 136, and 138. This filter is of the low pass type, and its constants should be proportioned so that the pulse repetition frequency of the radar is well above the cutoff frequency of the filter. After the voltage has passed the filter its wave form, as observed between output terminal 139 and ground, is essentially sinusoidal at the Doppler-shift frequency, as shown in graph (3) of Fig. 7. The waveform shown in graph (3) is, for the average case, somewhat idealized, since the operation of the Doppler modulation filter is not perfect. Frequency components of voltage other than the Doppler shift frequency are attenuated to such an extent in practice, however, that they do no more than superimpose small irregularities on the waveform as pictured. As was mentioned in a previous paragraph, the output voltage from the filter will be substantially zero if no Doppler shift is present in the echoes from the particular target under consideration, since the filter will in that case attenuate all the frequency components of the voltage fed into it.

Fig. 5 shows schematically the circuit of apparatus which may be employed as units 29 and 30 in the embodiment of Fig. 2. These units are, respectively, a differentiator-clipper and a counting circuit.

Voltage from the Doppler frequency amplifier and clipper, unit 28 on Fig. 2, is applied to the control grid of tube 150 through coupling condenser 151. Resistor 152 is connected between the grid of tube 150 and ground. The plate of tube 150 is connected to the positive side of D. C. source 165. The negative side of source 165 is grounded. The cathode of tube 150 is connected to ground by resistor 153. Condenser 161 is connected between the cathode of tube 150 and the plate of diode 170. The cathode of diode 160 is connected to the plate of diode 170. The plate of diode 160 is grounded. Condenser 171 is connected between the cathode of diode 170 and ground. The plate of triode tube 180 is connected to the cathode of diode 170; the cathode of tube 180 is grounded. Resistor 181 is connected between the grid of tube 180 and ground. Output terminal 185 is connected to the cathode of diode 170; counting circuit output voltage may be taken between terminal 185 and ground.

The positive side of D. C. source 165 is connected through resistor 201 to the plate of triode tube 200 and through resistor 211 to the plate of triode tube 211. The grid of tube 200 is connected to the plate of tube 210 through condenser 202 and to the cathode of tube 200 by resistor 203. Resistor 212 is connected between the grid of tube 210 and ground. Condenser 213 is connected between the cathode of tube 150 and the grid of tube 210. The cathodes of tubes 200 and 210 are connected together and connected to ground by resistor 204. Condenser 182 is connected between the plate of tube 210 and the grid of tube 180.

The operation of the circuit of Fig. 5 may best be described with reference to Fig. 8, which is a group of graphs in Cartesian coordinates having time as abscissa and voltage as ordinate. As in Fig. 7, no numerical calibration of axes is shown, and while all the time axes in Figure 8 are drawn to the same scale, no similarity of voltage scales from one graph to another is intended.

It will be recalled that the voltage output from the Doppler modulation filter, when the swept-gate generator is sweeping through a range sector, consists of a series of wave trains of Doppler voltage, each train representing a particular moving target. Each train has a duration equal to the time required for the swept gate to sweep through the range of a particular target; one fiftieth second was suggested as a typical value. The separation of succeeding wave trains depends upon their relative range. The series of trains, consisting of a wave train for each moving target intercepted, is periodic at the swept-gate frequency, which, as heretofore stated, might be about one cycle per second. For illustrative purposes, graph I of Fig. 8 represents the voltage at the output of the Doppler filter for two of the targets shown on Fig. 6, target "B" and target "C" respectively. The time axes of all the graphs of Fig. 8 are broken in the middle by dotted lines to show that, on the time scale used, the wave trains for targets "B" and "C" are actually separated by a greater interval than their physical separation on the drawing would indicate. It will be noted by reference to Fig. 6 that the radial velocity of target "C" is twice as great as that of target "B." Hence the frequency of the Doppler-shift voltage produced by target "C" is twice as high as that for target "B," as reference to graph I of Fig. 8 indicates. After the voltage at the output of the Doppler modulation filter has been passed through unit 28, a conventional overdriven amplifier and clipper, the waveform shown in graph II results. Note that while the wave has been squared and the peak values of the "B" target and "C" target voltages have been made equal by clipping, the frequencies of the voltages have not been altered.

The graph II voltage is applied to the differentiator and clipper circuit shown in Fig. 5, comprising tube 150 and associated circuits. The differentiator 151, 152 changes the applied square wave to trains of positive and negative pulses, and the clipper tube 150 clips off the negative pulses, resulting in a voltage at the cathode of tube 150 having the form shown in graph III of Fig. 8. This voltage is fed to the counter comprising tubes 160, 170, 180, 200 and 210, with their associated circuits.

The function of the counting circuit is to build up, during any given Doppler wave-train, a voltage across condenser 171 whose peak value is proportional to the frequency of the oscillations in that particular wave train. A means for rapid discharge of condenser 171 after the end of each Doppler wave train is of course essential, so as to prepare the circuit to respond to the succeeding wave train. The desired result is accomplished as follows: In the multivibrator comprising tubes 200 and 210, tube 200 is normally conducting and tube 210 is normally cut off. The first positive pulse in any wave train produced at the cathode of tube 150 (ref. to graph III of Fig. 8 for this waveform) is applied through condenser 213 to the grid of tube 210, triggering the multivibrator and causing the plate voltage of tube 210 to drop sharply. The drop in voltage at the plate of tube 210 is transmitted through condenser 182 to the grid of tube 180, driving the grid of that tube negatively beyond cutoff and rendering tube 180 non-conducting so long as the multivibrator remains in its unstable state. The constants of the multivibrator circuit are so chosen that the unstable state continues for an interval approximately equal to the duration of any single train of Doppler-shift voltage cycles. As heretofore stated, this duration might be about one fiftieth second.

In addition to triggering the multivibrator, the first positive pulse from tube 150 also drives a pulse of current through condenser 161, diode 170, and condenser 171. At the end of the pulse, the resulting accumulated charge on condenser 161 is rapidly drained off by diode 160, but the charge impressed on condenser 171 is retained, since tube 180 is non-conducting and no other discharge path is provided. Likewise all succeeding pulses in the train build up additional charge on condenser 171 in the same manner, and a step-voltage such as is shown in graph IV of Fig. 8 is produced. Since all the pulses are identical, the total charge accumulated on condenser 171 is a function of the number of pulses occurring during a train, that is, of the frequency of the Doppler voltage fed into the system.

At the termination of the train, the multivibrator returns to its stable state, tube 210 is cut off again, its plate voltage rises suddenly and the voltage rise is transmitted through condenser 182 to the grid of tube 180, rendering it again conducting. Tube 180 very rapidly drains off the charge on condenser 171, and the counter is ready to respond to another Doppler frequency wave train. The waveform of the voltage across condenser 171 is shown in graph IV of Fig. 8; observe that the peak voltage developed by the train from target "C" is approximately twice that developed by the train from target "B." That is, the peak value of the developed voltage across condenser 171 is proportional to the frequency of the Doppler-shift voltage in the individual wave-trains. The actual rise of voltage across condenser 171 is not perfectly linear; it occurs in exponentially diminishing steps. If, however, the relative magnitude of condensers 161 and 171 are chosen so that the total voltage across condenser 171 never exceeds a third or a quarter of the peak value of the pulses from tube 150, the voltages produced are linearly proportional to Doppler frequency for all practical purposes.

The series of step-voltages illustrated in Graph IV of Fig. 8 may be amplified and applied to the cathode ray indicator in the manner already described in discussing the operation of the Fig. 2 embodiment of the invention.

It will be understood that the embodiments of the invention herein shown and described are exemplary only, and that the scope of the invention is to be determined by reference to the appended claims.

The invention described herein may be manufactured and used by or for the Government of the United States of America for governmental purposes without the payment of any royalties thereon or therefor.

What is claimed is:

1. In a radio echo ranging system having a pulse radio transmitter operative to transmit periodic energy impulses and a receiver for receiving echoes of said impulses after reflection from remote objects, means operative to detect Doppler-effect frequency shift in echoes from a remote object and to derive from said echoes a voltage equal in frequency to said shift, cathode ray indicator means including beam deflection circuits for deflecting the electron beam of said indicator means in a first direction in synchronism with the operation of said transmitter, and means for periodically deflecting the electron beam of said indicator means in a direction at right angles to said first direction in response to said derived voltage to produce a visual indication of the presence and range of said remote object.

2. In a radio echo ranging system having a pulse radio transmitter operative to transmit periodic energy impulses and a receiver for receiving echoes of said impulses after reflection from remote objects, means operative to analyze successively for Doppler-effect frequency shifts the echoes from remote objects lying within predetermined limits of range and to derive from those echoes having such shifts a set of voltages having frequencies respectively equal to the frequency-shifts of said echoes, cathode ray indicator means including beam deflection circuits for deflecting the electron beam of said indicator means in a first direction in synchronism with the operation of said transmitter, and means for periodically deflecting the electron beam of said indicator means at right angles to said first direction in response to said set of voltages to produce visual indication of the presence and respective ranges of the objects whose said echoes have Doppler-effect frequency shifts.

3. In a radio echo ranging system, means operative to analyze successively for Doppler-effect frequency shifts the echoes from remote objects lying within predetermined limits of range and to derive from those echoes having such shifts a first set of voltages having frequencies respectively equal to the frequency shifts of said echoes, means for deriving from said first set of voltages a second set of voltages the amplitudes of which are respectively proportional to the frequencies of the corresponding voltages in the first set, cathode ray indicator means including electron beam producing means and beam deflection means, and means for applying to the beam deflection means of said indicator means alternatively the first set of voltages to produce visual indication of the presence and respective ranges of said remote objects, and the second set of voltages to produce visual indication of the respective relative radial velocities of said remote objects.

4. In a radio echo ranging system, means operative to analyze successively for Doppler-effect frequency shifts the echoes from remote objects lying within predetermined limits of range and to derive from those echoes having such shifts a first set of voltages having frequencies respectively equal to the frequency shifts of said echoes, means for deriving from said first set of voltages a second set of voltages the amplitudes of which are respectively proportional to the frequencies of the corresponding voltages in the first set, cathode ray indicator means including electron beam producing means and beam deflection means, and means for periodically applying to the beam deflection means of said indicator means the second set of voltages to produce visual indication of the presence, respective ranges, and respective relative radial velocities of those objects whose echoes have Doppler-effect frequency shifts.

5. In a radio echo ranging system, transmitter means operative periodically to transmit radio energy in short-duration impulses, receiver means operative to receive echoes therefrom reflected from remote objects, a normally inoperative signal channel fed by the receiver means, control means effective to render the signal channel operative after a time delay for a brief interval subsequent to each transmitted impulse, means for controlling the time delay intervening between the transmitted impulses and said brief intervals to cause the signal channel to pass echoes returning from a desired range, means fed by the signal channel operative to detect Doppler-effect frequency shift in the echoes fed thereto and to derive therefrom a voltage having the frequency of said Doppler-effect shift, cathode-ray indicator means, time-base deflection means for the indicator, and means operative responsively to the control means to apply said voltage to the indicator means during the said intervals when the signal channel is operative.

6. In a radio echo ranging system, transmitter means operative periodically to transmit radio energy in short-duration impulses, receiver means operative to receive echoes therefrom reflected from remote objects, a normally inoperative signal channel fed by the receiver means, control means effective to render the signal channel operative after a time delay for a brief interval subsequent to each transmitted impulse, means for controlling the time delay intervening between the transmitted impulses and said brief intervals to cause the signal channel to pass echoes returning from a desired range, means fed by the signal channel operative to detect Doppler-effect frequency shift in the echoes fed thereto and to derive therefrom a voltage having the frequency of said Doppler-effect shift, cathode ray indicator means, time base deflection means for the indicator, means operative responsively to the control means to apply said voltage to the indicator means during the said intervals when signal channel is operative, and means responsive to the frequency of said voltage operative to produce a visual indication proportional to said frequency.

7. In a radio echo ranging system, transmitter means operative periodically to transmit radio energy in short duration impulses, receiver means operative to receive echoes therefrom reflected from remote objects, a normally inoperative signal channel fed by the receiver means, control means effective to render the signal channel operative after a time delay for a brief interval subsequent to each transmitted impulse, means for varying periodically between controllable limits the time delay intervening between the transmitted impulses and said brief intervals at a frequency such that several radio impulses are transmitted while the delay changes by an amount of time equal to one of said brief intervals, means fed by the signal channel operative to detect Doppler-effect frequency shift in echoes fed thereto and to derive therefrom a voltage having a frequency equal to the Doppler-effect shift of the echoes being passed by the signal channel, cathode ray indicator means, time base deflection means for the indicator, and means operative responsively to the control means to apply said voltage to the indicator means during the said intervals when the signal channel is operative.

8. In a radio echo ranging system, transmitter means operative periodically to transmit radio energy in short duration impulses, receiver means operative to receive echoes therefrom reflected from remote objects, a normally inoperative signal channel fed by the receiver means, control means effective to render the signal channel operative after a time delay for a brief interval subsequent to each transmitted impulse, means for varying periodically between controllable limits the time delay intervening between the transmitted impulses and said brief intervals at a frequency such that several radio impulses are transmitted while the delay changes by an amount of time equal to one of said brief intervals, means fed by the signal channel operative to detect Doppler-effect frequency shift in echoes fed thereto and to derive therefrom a first voltage having a frequency equal to the Doppler effect shift of the echoes being passed by the signal channel, means responsive to the first voltage operative to produce a second voltage having peak value proportional to the frequency of the first voltage, cathode ray indicator means, time base deflection means for the indicator, and means operative responsively to the control means to apply the second voltage to the indicator means during the said intervals when the signal channel is operative.

9. In a radio echo ranging system, transmitter means operative periodically to transmit radio energy in short-duration impulses, receiver means operative to receive echoes therefrom reflected from remote objects, a normally inoperative signal channel fed by the receiver means, control means effective to render the signal channel operative after a time delay for a brief interval subsequent to each transmitted impulse, means for varying periodically between controllable limits the time delay intervening between the transmitted impulses and said brief intervals at a frequency such that several radio impulses are transmitted while the delay changes by an amount of time equal to one of said brief intervals, means fed by the signal channel operative to detect Doppler-effect frequency shift in echoes fed thereto and to derive therefrom a first voltage having a frequency equal to the Doppler effect shift of the echoes being passed by the signal channel, means responsive to the first voltage operative to produce a second voltage having peak value proportional to the frequency of the first voltage, cathode ray indicator means, time base deflection means for the indicator operative to produce a systematic sweep deflection of the ray after each transmitted impulse, and means operative responsively to the control means to apply on some sweeps the first voltage to the indicator means during the said intervals when the signal channel is operative and similarly to apply the second voltage on the remainder of said sweeps.

10. In a radio echo ranging system including a transmitter for producing pulsed radio frequency signals, receiver means for receiving echo signals from remote moving objects having a velocity in a radial direction relative to said transmitter, said receiver means operative to measure the range and said radial velocity of said remote objects and comprising a normally inoperative first amplifier for said echo signals, gate means conditioning said amplifier for operation on echoes from an object within a selected increment of range, means deriving from the output of said first amplifier a first voltage responsive to a Doppler-effect frequency shift in said selected echo signals, cathode ray indicator means including a time base, a normally inoperative second amplifier for said first voltage, said gate means conditioning said second amplifier for transmitting said first voltage to said indicating means during the interval corresponding to said selected increment of range, whereby said first voltage will indicate the presence of said object at said selected range, means deriving from the output of said first amplifier a second voltage proportional in magnitude to said Doppler-effect frequency shift in said selected echo signals, means connected to said indicator means operative to display said second voltage in association with said first voltage, whereby said second voltage will indicate the radial velocity of said object at said selected range, and means controlling said gate means for varying said selected increment of range.

11. In a radio echo ranging system including a transmitter and a receiver, means for indicating the presence of echo signals from moving objects only comprising an input channel, gate means conditioning said input channel for passage of echo signals from objects within a selected increment of range, means heterodyning echo signals from a moving object with echo signals from unmoving objects within said range increment, means deriving from said heterodyning means a voltage modulated at the difference frequence between said moving object echo signals and said unmoving objects echo signals, cathode ray indicator means, including beam deflection means operative to deflect the electron beam of said indicator means in synchronism with the operation of said transmitter, and means conditioned by said gate means for transmitting said voltage to said indicator means, whereby said voltage will indicate the presence of said moving object only within said selected increment of range, and means controlling said gate means for varying said selected increment of range.

12. In a radio echo ranging system including a transmitter and receiver for spaced pulse signals, a normally blocked input channel, gate means unblocking said input channel for a brief interval at a selected time after the transmission of each of said pulsed signals, detector means in said input channel operative to derive voltages only from input signals which have a frequency shift due to Doppler-effect, scanning control means for continuously varying said selected time, cathode ray indicator means including beam deflection means for deflecting the electron beam of said indicator means in synchronism with the operation of said transmitter, and means responsive to said control means for displaying said derived voltages on said indicator in spaced relation corresponding to said selected time.

13. In a radio pulse ranging system including a transmitter and receiver for spaced pulse signals, a normally blocked input channel, gate means unblocking said input channel for a brief interval at a selected time after the transmission of each of said pulsed signals, said input channel including means operative when the input channel is unblocked to derive voltages only from input signals which have a frequency shift due to Doppler-effect, cathode ray indicator means connected to said input channel for displaying said derived voltages said indicator means including beam deflection circuits operative to deflect the electron beam of said indicator means in synchronism with the operation of said transmitter, and control means for varying said selected time.

References Cited in the file of this patent
UNITED STATES PATENTS

| Number | Name | Date |
|---|---|---|
| 2,134,716 | Gunn | Nov. 1, 1938 |
| 2,403,625 | Wolff | July 9, 1946 |
| 2,406,316 | Blumlein et al. | Aug. 27, 1946 |
| 2,406,358 | Doba | Aug. 27, 1946 |
| 2,408,742 | Eaton | Oct. 8, 1946 |
| 2,414,798 | Budenbom | Jan. 28, 1947 |
| 2,415,095 | Varian | Feb. 4, 1947 |
| 2,450,945 | Eaton | Oct. 21, 1948 |
| 2,455,639 | Anderson | Dec. 7, 1948 |
| 2,479,568 | Hansen | Aug. 23, 1949 |